April 2, 1935.  H. E. KITCHEN  1,996,380
GEAR CUTTING MACHINE
Filed Dec. 20, 1930  5 Sheets-Sheet 1

Inventor
Harry E. Kitchen
By Rockwell and Bartholow
Attorneys

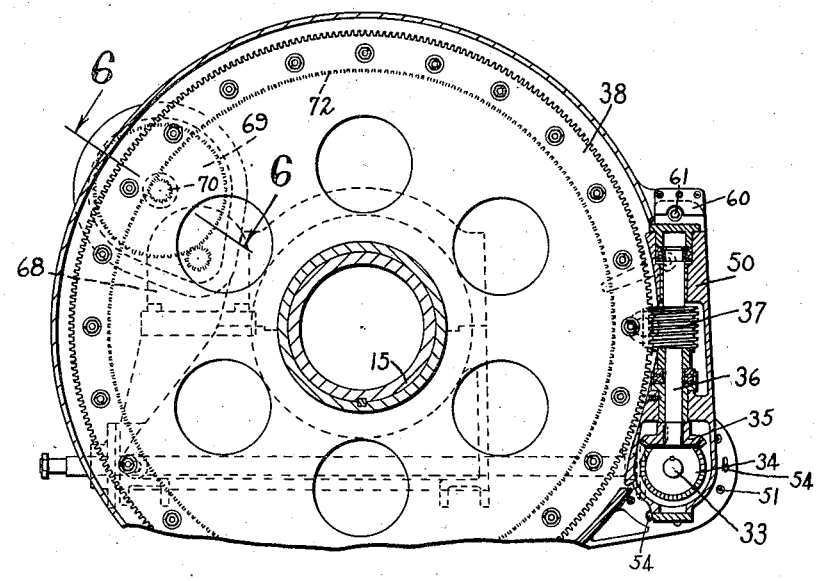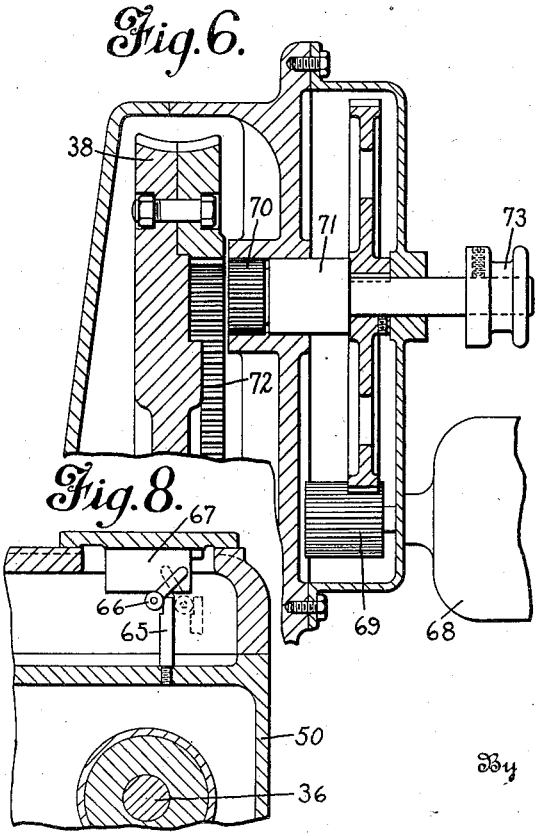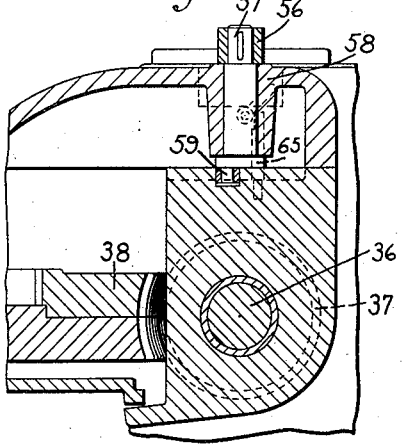

April 2, 1935. H. E. KITCHEN 1,996,380
GEAR CUTTING MACHINE
Filed Dec. 20, 1930 5 Sheets-Sheet 3
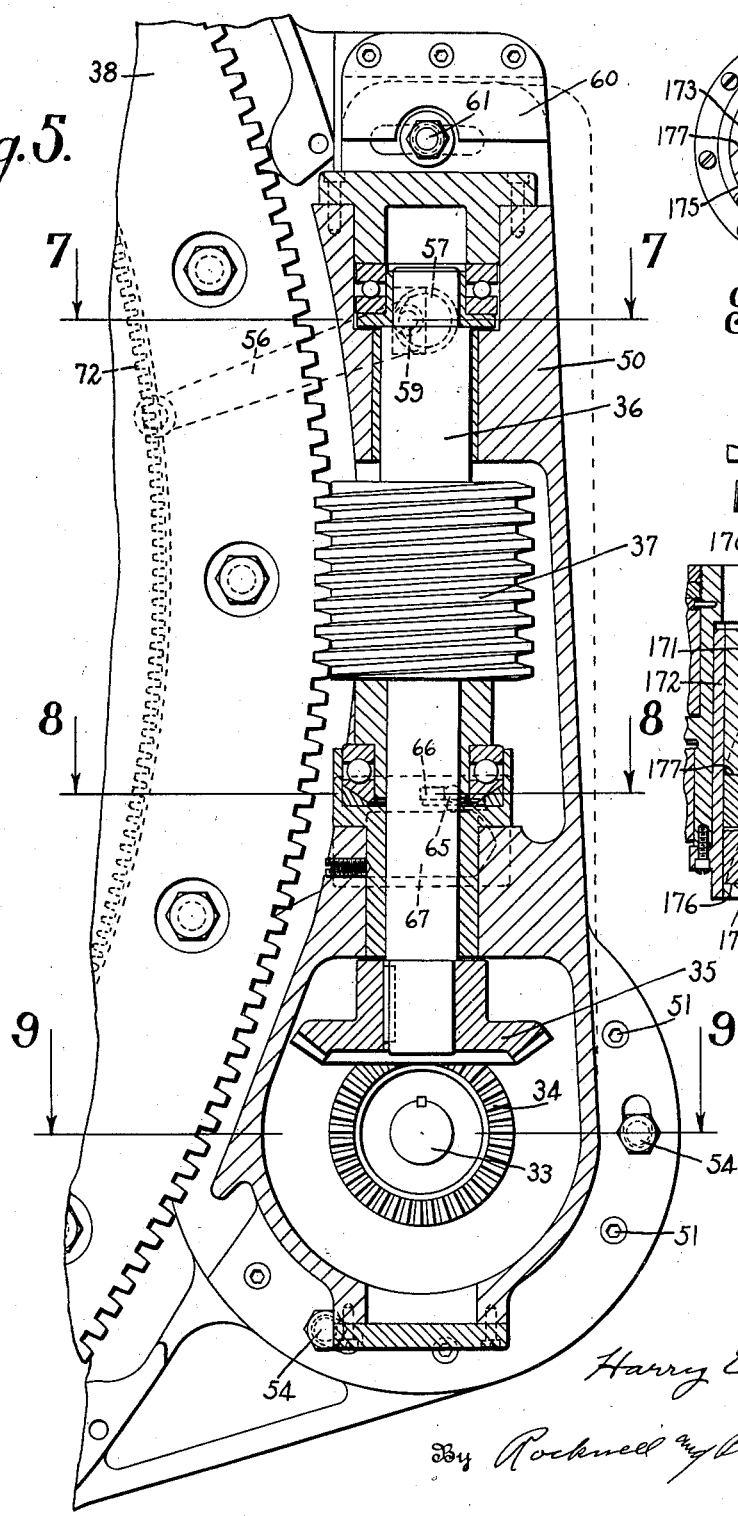
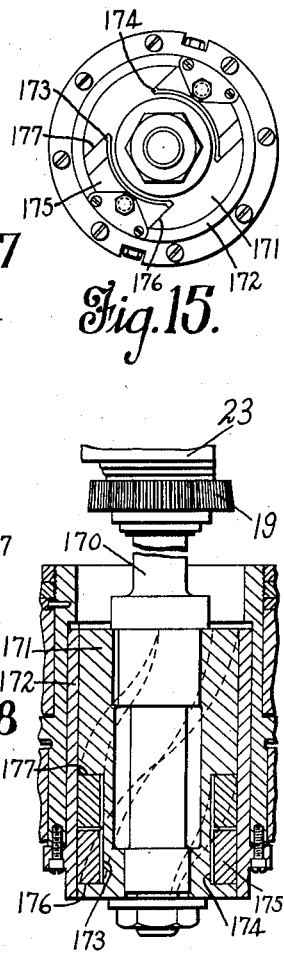
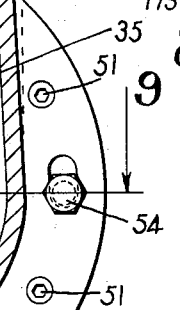
Inventor
Harry E. Kitchen
By Rockwell My Bartholow
Attorneys April 2, 1935.    H. E. KITCHEN    1,996,380
GEAR CUTTING MACHINE
Filed Dec. 20, 1930    5 Sheets-Sheet 4

Inventor
Harry E. Kitchen
By Cockrell and Bartholow
Attorneys

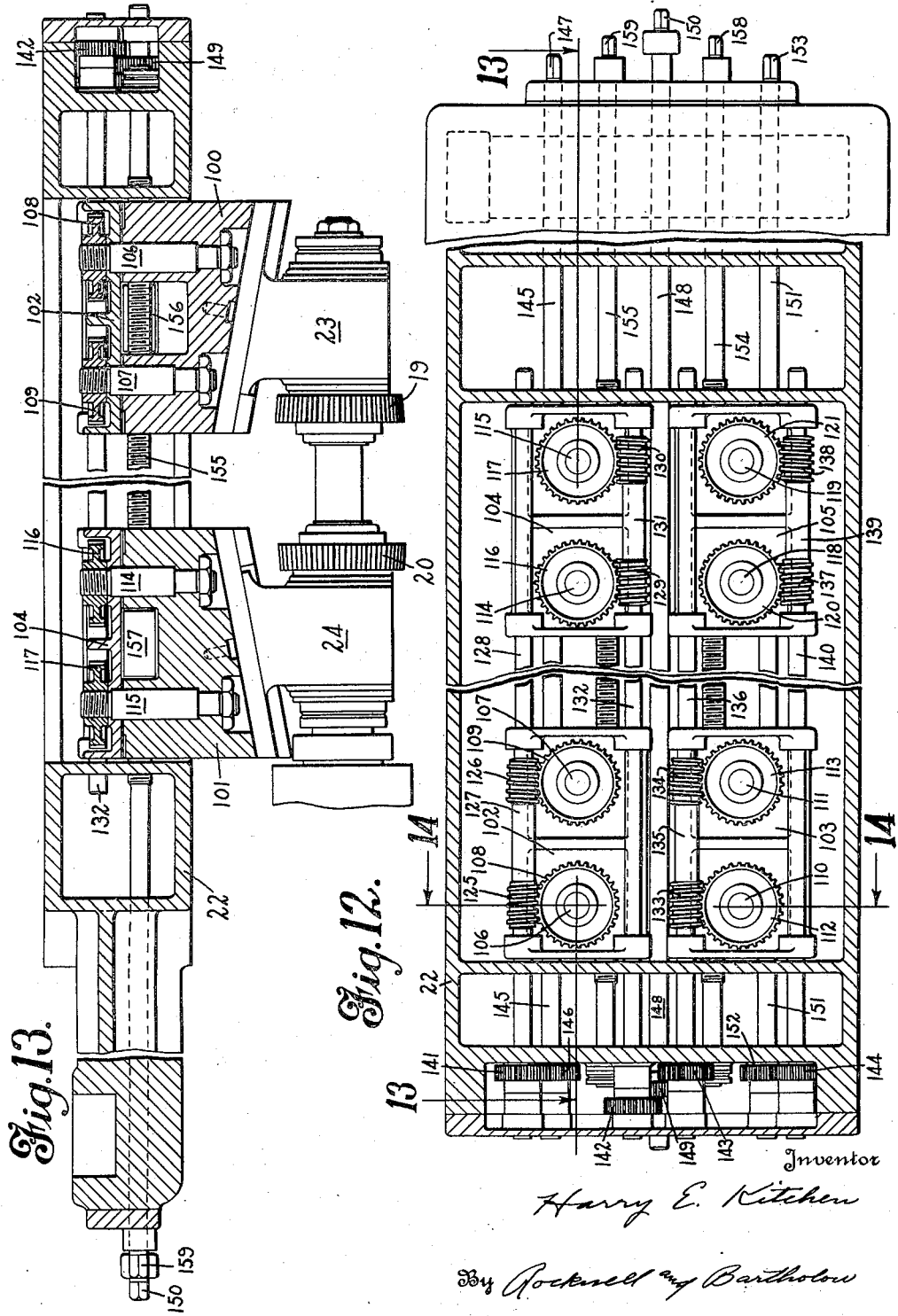

Patented Apr. 2, 1935

1,996,380

UNITED STATES PATENT OFFICE 1,996,380

GEAR CUTTING MACHINE

Harry Edgar Kitchen, Buffalo, N. Y., assignor to Farrel-Birmingham Company, Inc., Buffalo, N. Y.

Application December 20, 1930, Serial No. 503,668

29 Claims. (Cl. 90—9)

This invention relates to improvements for forming the teeth of gears and is more particularly concerned with a machine for the cutting of helical or double helical teeth upon a gear blank, in which one or more cutters are moved across the face of the gear blank during the cutting operation. The cutters are given, besides this reciprocatory movement across the face of the blank, a helical or twisting movement when cutting helical teeth, a bodily relieving movement to enable them to clear the work during their inoperative strokes, and to both cutters and work is imparted a continuous generating feeding movement to present the entire surface of the blank to the cutters and to generate the tooth formed thereon.

The present application deals particularly with improvements in machines of the general type shown in a patent to William E. Sykes, No. 1,814,348, July 14, 1931, and in a Patent No. 1,694,042 issued to William E. Sykes, December 4, 1928, and is concerned with certain features of construction designed to improve the operation of machines of this character.

One object of my invention is to provide an improved gear cutting machine whereby gears of relatively large diameter may be efficiently formed and wherein the cutting tools, together with the operating mechanisms therefor and the power supplying means for the operation of the entire machine, are mounted upon a saddle that is movable toward and away from the gear blank.

Another object is to provide an improved form of arbor support, and especially one having provision to permit the use of arbors of different diameters and whereby a greater degree of accuracy is obtained.

Still another object is to provide auxiliary means for rotating the gear blank and control means therefor whereby operation thereof is prevented when other operative parts of the machine are in normal operative arrangement.

A further object is to provide in such a machine, a part in driving engagement with another part, and which is disengageable therefrom to permit the independent rotation of the gear blank and which, when so disengaged, will automatically arrange control means for an auxiliary gear blank rotating means to permit the latter to operate.

A still further object is to provide means to steady the gear blank and which will engage the blank adjacent its periphery to prevent uneven rotation and sidewise movement thereof when the same is being rotated, and to brace the same against side strains while teeth are being formed thereon by the action of the cutting tools.

A still further object is to provide improved cutting tool clamping means that will more efficiently clamp and retain the cutting tools in operative position than has heretofore been done.

A still further object is to improve the structure of the cutter twisting guides whereby the operation thereof will be improved and the possibility of the parts binding will be obviated.

Further, the invention contemplates simplifying generally the operation of machines of this character, and providing a combination of mechanisms which will be comparatively economical to manufacture and especially efficient in use.

To these and other ends, the invention consists in the novel features and combinations of parts to be hereinafter described and claimed.

In the accompanying drawings:

Fig. 4 is a section on line 4—4 of Fig. 1;

Fig. 5 is an enlarged section corresponding to a portion of Fig. 4;

Fig. 6 is a section on line 6—6 of Fig. 4;

Fig. 7 is a section on line 7—7 of Fig. 5;

Fig. 8 is a section on line 8—8 of Fig. 5;

Fig. 12 is a section on line 12—12 of Fig. 1;

Fig. 13 is a section on line 13—13 of Fig. 12;

Fig. 15 is an end view of the improved twisting guide of this invention, and

Fig. 16 is an axial section from the same generally on lines 16—16 of Fig. 1.

Figure 1:
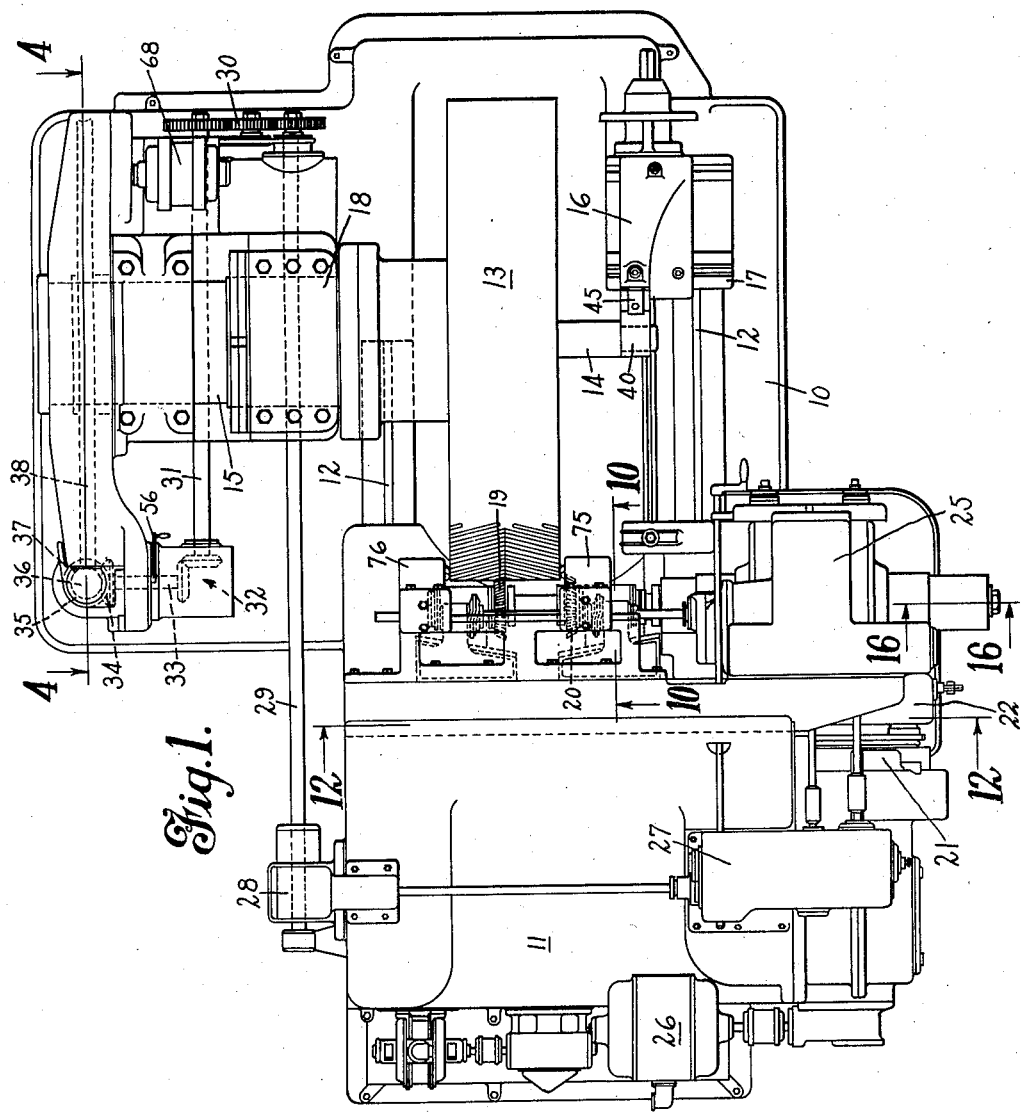
Fig. 1 is a plan view of a machine embodying the features of this invention.

A machine embodying the features of this invention (see Fig. 1), generally comprises a base or bed 10, a saddle 11 that is slidably mounted upon ways 12 provided upon the base 10. A gear blank 13 may be mounted upon an arbor 14, one end of which is suitably secured to a shaft 15 for rotation thereby and the other end is rotatably supported in my improved arbor support 16. The arbor support 16 is suitably supported on ways 17 for adjustment upon the base in directions parallel to the axis of shaft 15. The shaft 15 is journaled in bearings 18, provided upon the base 10.

As previously mentioned, this machine is of the type wherein cutters, such as 19 and 20, are reciprocated across the face of a gear blank 13 and are further given a twisting movement and a continuous tooth forming generating movement. Suitable mechanisms for these movements are mounted upon the saddle 11, and comprise mechanism for reciprocating the cutters which is substantially disposed at 21, and mechanism for twisting and providing the cutters with a continuously rotating movement, which is generally disposed at 25. The reciprocating mechanism generally comprises a crank mechanism which acts upon a carriage 22, slidably mounted upon the saddle 11, the cutters 19 and 20 being mounted upon the carriage 22 in holders 23 and 24 respectively. A detailed description of the structure and operation of the above mentioned mechanisms may be obtained by reference to the above mentioned patents.

The power to operate the various cutter moving mechanisms and also to rotate the gear blank, is obtained from an electric motor 26, which is suitably mounted upon the saddle 11. The motor 26, through gearing housed at 27, and a slidable connection disposed at 28, is drivingly connected to a shaft 29. The shaft 29, through a set of change gears 30, a shaft 31, bevel gears 32, a shaft 33 and bevel gears 34 and 35, is drivingly connected to a shaft 36 upon which a worm 37 is mounted. The worm 37 may be meshed with worm wheel 38 that is secured upon shaft 15.

Figure 2:
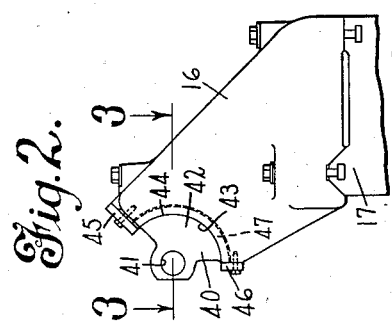
Fig. 2 is the side elevation of an improved form of arbor support used with a machine of this invention.
Figure 3:
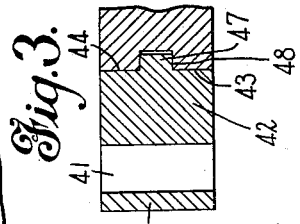
Fig. 3 is a section on line 3—3 of Fig. 2.
Figure 9:
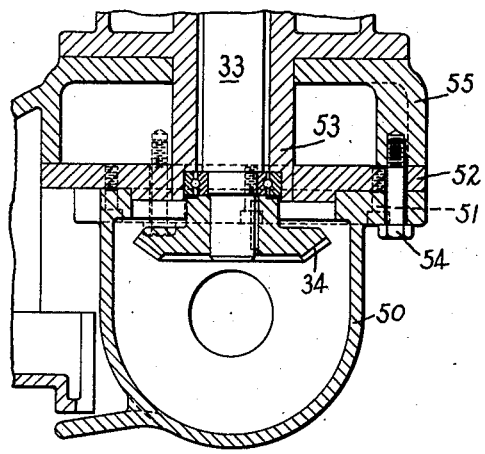
Fig. 9 is a section on line 9—9 of Fig. 5.
Figure 14:
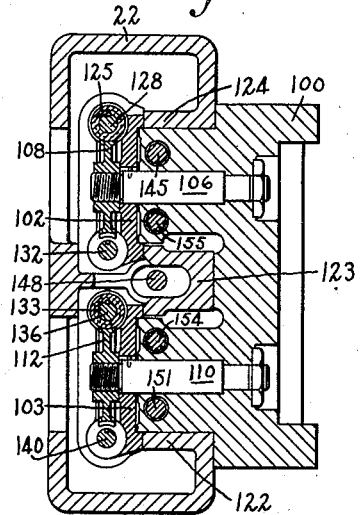
Fig. 14 is a section on line 14—14 of Fig. 12.

The arbor support 16 (see Figs. 1, 2 and 3), is provided with an arbor receiving bushing 40, which is provided with an arbor receiving opening 41, and an arcuate support engaging portion 42, the arcuate surface 43 of the latter being concentric with the opening 41 and accurately fitted to an arcuate seat 44, formed in the upper end of the support 16. Clamp plates 45 and 46 disposed one at either end of the seat 44 and overlapping the ends of the arcuate portion 42, securely retain the bushing 40 to the support 16 and insure tight engagement of the surface 43 upon the seat 44.

To prevent relative axial movement between the support 16 and the bushing 40 a tongue and groove arrangement is provided between the two parts. In this instance, a tongue 47 is provided on the bushing 40 extending out from and about the arcuate surface 43 and into a groove 48 form in the arcuate seat 44.

By providing a plurality of bushings of the above form, each having an arguate surface to fit the arcuate seat in the support 16, and arbor openings of different diameters, it is possible to use arbors of different diameters and insure that they will be efficiently and accurately supported in substantially perfect alignment with the shaft 15. By the provision of the readily removable clamps 45 and 46, the bushings may be interchanged when desired and the care usually necessary when interchanging or adjusting such devices, to insure accuracy, will not be required, due to the form of the bushings provided.

The worm 37 (see Figs. 1, 4, 5, 7, 8 and 9) is arranged in respect to worm wheel 38 so that it may be meshed and unmeshed therefrom as desired, by swinging it toward or away from the worm wheel about the center of shaft 33. Shaft 36 is journaled in a casing 50, that is secured by screws 51 to a plate 52. The plate 52 is rotatably mounted upon a stationary machine part 53, within which the shaft 33 rotates and is journaled. The casing 50 and plate 52 are provided with arcuately elongated openings through which screws 54 extend and thread into a stationary machine part 55. By loosening screws 54, the casing 50 may be swung about shaft 33 upon machine part 53 as the pivot, whereby worm 37 will be meshed or unmeshed with worm wheel 38.

To cause and control the swinging movement of casing 50, a lever 56 is provided that is secured to a shaft 57. The shaft 57 extends through a stationary machine part 58, in this instance being a portion of the worm wheel casing, and is adapted to swing the worm casing 50 by means of a roller or pin 59 that is eccentrically mounted upon the end of shaft 57, and which cooperates with the worm casing 50 in an opening provided therefor. The upper end of casing 50 is guided in a suitable guideway 60, and by means of a screw 61 may be clamped thereto in any of the adjusted positions into which it is swung.

A stud or pin 65 (see Figs. 1 and 4 to 8 inclusive), is provided upon the casing 50 in proper position to engage a lever arm 66 of an electrical cut-out 67, that is suitably included in the electric circuit of an auxiliary electric motor 68. The motor 68 is mounted upon the base 10, adjacent the worm wheel 38, and by suitable gearing 69 drives a pinion 70 that is secured to an axially slidable shaft 71. The pinion 70 may be axially moved toward the worm wheel 38 to cause it to mesh with the internal teeth 72, formed on the worm wheel, by means of a knob 73 secured to the outer end of shaft 71.

The arrangement of the control of the electrical cut-out 67 by means of lever 66 and pin 65, is such that when the worm 37 is in mesh with worm wheel 38 the electrical circuit of motor 68 is open and the motor cannot be started. When the worm 37 is swung away from worm wheel 38 to unmeshed position therewith, the lever 66 is disengaged from the control of pin 65, whereby the cut-out is permitted to close the motor circuit, and motor 68 may be started to rotate worm wheel 38, which in turn rotates the gear blank independently of the other machine mechanisms. It will be understood that the motor 68 and driving connections associated therewith are designed to drive the gear blank at a speed in excess of that provided through the worm 37.

Figure 10:
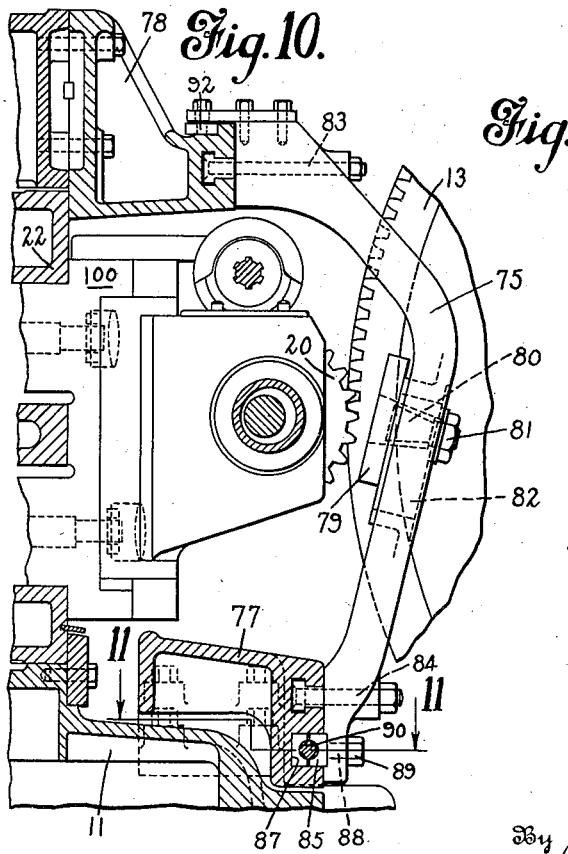
Fig. 10 is a partial sectional elevation on line 10—10 of Fig. 1.
Figure 11:
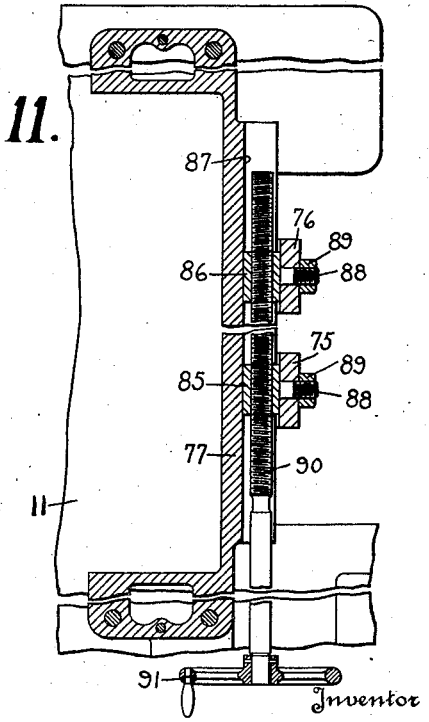
Fig. 11 is a section on line 11—11 of Fig. 10.

Mechanism for steadying gear blanks of large diameter is illustrated in Figs. 1, 10 and 11. This mechanism comprises a pair of frames 75 and 76, slidably retained upon the saddle 11 by brackets 77 and 78 which are secured to the saddle and extend outwardly from a front face thereof, the bracket 77 being disposed below the cutters 19 and 20 and bracket 78 above the same. The frames 75 and 76 extend outwardly from the brackets and beyond the cutters sufficiently to overlap the blank, and are disposed one on either side thereof. The frames 75 and 76 are each composed of two inclined portions 75$^a$ and 75$^b$. Portion 75$^a$ extends from bracket 77 upwardly and is inclined outwardly away from the cutters, while portion 75$^b$ extends from bracket 78 downwardly and is inclined outwardly to meet portion 75$^a$.

A roller 79 is secured to each frame portion 75$^a$ and is adjustable thereon for positioning it to engage the side surface of the rim portion of the blank by means of a screw stud shaft 80 and nut 81, the shaft 80 being extended through an elongated opening 82 in the frame portion 75$^a$. Being disposed on the inclined portion 75$^a$ by bolt 80, that is slidable in the elongated opening 82, the rollers 79 are transversely adjustable with respect to the end face of the blank 13 whereby they may be positioned close to the periphery of the blank or spaced inwardly therefrom to insure contact with the end face of the rim regardless of its width.

T-bolts 83 and 84 are provided to slidingly secure the upper and lower ends respectively of each frame to the brackets 77 and 78. Each of the frames 75 and 76 is provided with a threaded member 85 and 86 respectively, which is secured thereto at the lower end thereof, and is slidable in a groove 87 provided in bracket 77. The threaded members or nuts 85 and 86 secured to the respective frames by means of studs 88 and nuts 89.

A threaded rod 90 passes through the nuts 85 and 86 and extends to one side of the machine, where it is provided with a hand wheel 91. The nuts 85 and 86 and the corresponding threaded portions of rod 90 are oppositely threaded so that when the rod 90 is rotated in one direction, the frames 75 and 76 will be drawn together and each will approach the blank, and when the rod is rotated in the other direction the frames will separate and move away from the blank. The rod 90 not being secured to a stationary part of the machine, but being what might be called "floating" in nuts 85 and 86, with respect to the saddle 11, permits the adjustment of the frames with respect to the blank so that an even pressure of the rollers 79 against the blank rim is obtained. For instance, when the rod 90 is rotated to draw the frames together, one of the rollers may engage one side of the blank rim before the other does, but by a continuance of the rotation of rod 90, the other roller will be drawn into contact with the other side of the blank rim due to the differential arrangement of the threaded portions of the rod, as above described.

By tightening the T-bolts 83 and 84, the frames 75 and 76 may be securely retained in their adjusted positions. An anti-friction roller 92 is secured to the upper end of each frame and engages a shoulder on bracket 78 to relieve the T-bolt 83 from the strain of the weight of each frame when the bolts 83 and 84 are loosened, and also assist in the ease of sliding the frames when adjusting them.

As mentioned above, the cutters 19 and 20 are mounted in holders 23 and 24, that are secured to the reciprocating slide or carriage 22. The holders 23 and 24 are secured to carriage 22 by means whereby they are adjustable to separate or draw together the cutters, as desired, and to clamp them in their adjusted positions. This means is illustrated in Figs. 1, 10, 12, 13 and 14, and comprises supports 100 and 101, upon which holders 23 and 24 are respectively mounted, clamp plates 102 and 103 associated with support 100, clamp plates 104 and 105 associated with support 101, a pair of clamp bolts and nuts therefor for each plate the latter being in the form of worm wheels, means to rotate the worm wheels to cause the supports 100 and 101 to be rigidly and evenly clamped to the carriage 22, and means to adjust the supports lengthwise of the carriage. Clamp bolts 106 and 107 and worm wheels 108 and 109 are provided for use with clamp plate 102, bolts 110 and 111 and worm wheels 112 and 113 are provided for use with clamp plate 103. Clamp bolts 114 and 115 and worm wheels 116 and 117 are provided for use with clamp plate 104, and clamp bolts 118 and 119 with worm wheels 120 and 121 are provided for use with clamp plate 105. The clamp bolts are secured against rotation to the respective support through which they pass, and are threadingly engaged by the corresponding worm wheel upon an end of each that extends beyond the respective support and through the respective clamp plate. By rotation in one direction upon its corresponding bolt, each worm wheel draws the support and clamp plate associated therewith toward each other to engage portions 122, 123 and 124 of the carriage 22 therebetween.

The means for rotating the worm wheels comprises a rotatable worm for each worm wheel and operating rods or shafts that extend through the carriage 22 from one end to the other and which are drivingly connected to the worm shafts by suitable gearing. Worms 125 and 126 formed upon a common hub sleeve 127, that is slidingly keyed to a shaft 128, are provided to rotate worm wheels 108 and 109 respectively. Worms 129 and 130 formed upon a common hub sleeve 131, that is slidingly keyed to shaft 132, are provided to rotate worm wheels 116 and 117. Worms 133 and 134 formed upon a common hub sleeve 135, that is slidingly keyed to shaft 136, are provided to rotate worm wheels 112 and 113 respectively. Worms 137 and 138 formed upon a common hub sleeve 139, that is slidingly keyed to shaft 140 are provided to rotate worm wheels 120 and 121 respectively.

The shafts 128, 132, 136 and 140 are extended to one end of the carriage 22, and a gear 141, 142, 143 and 144 is respectively secured to each. A rod or shaft 145, having a gear 146 secured at one end thereof in mesh with gear 141, extends through the carriage 22 to the other end thereof where the rod 145 is provided with a wrench engaging head 147. A rod or shaft 148, having a gear 149 secured at one end thereof, adapted to be meshed with either gear 142 or 143, extends through the carriage to the other end thereof, where the rod 148 is provided with a wrench engaging head 150. Shaft 148 is axially slidable to mesh gear 149 with either gear 142 or gear 143, as desired. A rod or shaft 151 having a gear 152 secured at one end thereof in mesh with gear 144, extends through the carriage to the other end thereof where the rod 151 is provided with a wrench engaging head 153.

The cooperating worms, worm wheels and bolts are arranged in such a manner that rotation of the common hub of each pair of worms in one direction will cause each worm wheel of the respective pair to rotate in a direction to clamp the respective support to the carriage. There is a differential action between each worm of each pair due to the sliding connection of their common hub with the respective shaft to which it is keyed. This action is such that when one worm wheel of the pair is rotated sufficiently to insure a tight clamping effect, the rotation of the other worm wheel may be continued to insure a tight clamping effect thereby. This effect is obtained by causing one of the worm wheels of each pair to rotate in an opposite direction than that of the other when clamping. This may be accomplished, for instance, by providing that the worm 125 be a left-hand worm and the threads on bolt 106 be right-hand threads, while worm 126 is a right-hand worm and the threads on bolt 107 are left-hand ones. Such an arrangement permits worm 125, should the clamping effect of worm wheel 108 be sufficient, to continue to rotate by cooperation with the teeth in worm wheel 108, as if in a nut, thereby sliding sleeve 127 along shaft 128 while rotating worm wheel 109 by means of worm 126 to cause the worm wheel 109 to clampingly operate with bolt 107.

The supports 100 and 101 may be adjusted lengthwise on carriage 22 by means of threaded rods 154 and 155 respectively. Rods 154 and 155 extend from one end of carriage 22 to the other, being suitably secured against axial movement relatively thereto. Nuts 156 and 157 suitably secured to supports 100 and 101 respectively, threadingly cooperate with rods 154 and 155 respectively. By rotation of either of the rods 154 and 155, the respective support may be moved along carriage 22 lengthwise thereof to any desired position and there clamped, as above described. Rods 154 and 155 are provided with wrench engaging ends 158 and 159 respectively to facilitate the rotation thereof.

The cutters 19 and 20 are each mounted upon a shaft, cutter 19 being mounted on one end of a shaft 170 the other end of which is secured to a sleeve 171. Sleeve 171 is reciprocable with the respective cutter through a cylindrical bearing member 172. A pair of diametrically opposed grooves 173 and 174, in this instance shown helical in form for the production of helical gears, although in cutting spur gears this groove would be straight, are formed in the periphery of sleeve 171 and are adapted to receive a two-part guide member 175 which is secured to the bearing member 172. In order to insure improved operation and to obviate the possibility of the engaging parts binding, the sides 176 and 177 of each groove and the corresponding sides of each guide member are parallel being disposed tangent to a circle which is concentric with the sleeve 171 and is of a diameter substantially equal to the width of the grooves.

By the provision of the above described means in a gear cutting machine of the type referred to, the operation thereof is generally simplified, the machine as a whole will be comparatively economical to manufacture and especially efficient in use. The arrangement whereby the motor 26 for driving the machine is mounted upon the saddle 11 together with the necessary change and reduction gearing, eliminates various interconnecting means required when the same is mounted upon the base and also insures more positive and accurate machine operation. The provision of interchangeable arbor bushings in a machine of this type facilitates the setting up of the same for cutting gears of different dimensions and the particular form thereof insures accuracy of axial alignment and trueness in rotation. The hinged or swinging worm 37 and its control of the auxiliary motor 68 when the worm is swung to mesh or unmesh it from the worm wheel 38, permits the operation of motor 68 to rotate the blank independently of the other movable mechanisms without disturbing their adjustments, and insures that the auxiliary motor cannot be accidentally operated. The blank rim steadying mechanism is especially useful when gears of comparatively large diameter are being formed and insures accuracy and evenness in the rotation of the blank. The cutter support clamping mechanism insures rapid and positive securing of the cutter supports to the carriage 22 and by the provision of differentially acting worms insures that the clamping effect will be evenly distributed.

While I have shown and described a preferred embodiment of my invention, it will be understood that it is not to be limited to the details shown but is capable of modification and variation within the spirit of the invention and the scope of the appended claims.

What I claim is:

1. In a gear cutting machine of the type wherein a pinion-shaped cutter is reciprocated across the face of a gear blank and rotated in synchronism therewith to generate gear teeth thereon, means to reciprocate the cutters, means to rotate the cutters, a machine base for supporting a gear blank, means for rotating the blank, a saddle mounted upon said base for sliding movement toward and away from the gear blank, an electric motor mounted upon said saddle to drive said cutter reciprocating means and said cutter rotating means, and connections between said motor and blank rotating means including a shaft having a support on the saddle and extending to the front of the base, and change gears there connecting said shaft with the blank rotating means.

2. In a gear cutting machine of the type wherein a pinion-shaped cutter is reciprocated across the face of a gear blank and rotated in synchronism therewith to generate gear teeth thereon, means to reciprocate the cutters, means to rotate the cutters, a machine base for supporting a gear blank, a saddle mounted upon said base for sliding movement toward and away from the gear blank, means mounted on said base to rotate said gear blank, means on the saddle connected to the gear blank rotating means to actuate the same, means mounted on the base connected to said gear blank rotating means to rotate the same, and connections between said means whereby one may not be operated until the other is rendered inoperative.

3. In a gear cutting machine of the type wherein a pinion-shaped cutter is reciprocated across the face of a gear blank and rotated in synchronism therewith to generate gear teeth thereon, means to reciprocate the cutters, means to rotate the cutters, a machine base for supporting a gear blank, a saddle mounted upon said base for sliding movement toward and away from the gear blank, means mounted on said base to rotate said gear blank, an electric motor mounted upon said saddle to drive said cutter reciprocating means and said cutter rotating means, a releasable driving connection between said motor and said gear blank rotating means, independent gear blank rotating means, and means operable only upon the release of said driving connection to permit said independent gear blank rotating means to be operated.

4. In a gear cutting machine of the type wherein a pinion-shaped cutter is reciprocated across the face of a gear blank and rotated in synchronism therewith to generate gear teeth thereon, means to rotate the gear blank in synchronism with the aforesaid cutter movements, means to independently rotate the gear blank, and control means for said independent gear blank rotating means, whereby it is operable only when said first-named gear blank rotating means is inoperable.

5. In a gear cutting machine, a cutting tool reciprocable across the face of a blank, means to reciprocate said cutting tool, means to rotate the gear blank, releasable interconnecting means between said cutting tool reciprocating means and said gear blank rotating means, means to independently rotate said gear blank, and control means for said last named means operable by the release of said interconnecting means to permit the operation of said independent gear blank rotating means.

6. In a gear cutting machine, a cutting tool reciprocable across the face of the blank, means to reciprocate said cutting tool, means to rotate the gear blank, releasable interconnecting means between said cutting tool reciprocating means and said gear blank rotating means, means to independently rotate said gear blank, and control means for said last named means operable when the interconnecting means is in operation to prevent the operation of said independent gear blank rotating means.

7. In a gear cutting machine, a cutting tool reciprocable across the face of a blank, means to reciprocate said cutting tool, means to rotate the gear blank including a separable worm and worm wheel, said worm being drivingly connected to said cutter reciprocating means, means to independently rotate said gear blank, and control means for said last named means operable when said worm and worm wheel are separated to permit the operation of said independent gear blank rotating means.

8. In a gear cutting machine, a cutting tool reciprocable across the face of a blank, means to reciprocate said cutting tool, means to rotate the gear blank including a worm and worm wheel, said worm being drivingly connected to said cutter reciprocating means and swingable toward and away from said worm wheel to be meshed and unmeshed therewith, means to independently rotate said gear blank, and control means for said last named means operable when said worm is swung away from said worm wheel to permit the operation of said independent gear blank rotating means.

9. In a metal working machine, a work rotating mechanism including a worm and worm wheel, said worm being swingable toward and away from said worm wheel to be meshed and unmeshed therewith, work rotating means independent of said work rotating mechanism, and control means for said last named means operable when said worm is swung away from said worm wheel to permit the operation of said independent work rotating means.

10. In a gear cutting machine wherein a cutting tool is reciprocated across the face of a rotating gear blank during its cutting operation thereon, means to rotate the gear blank, and means between which the gear blank rotates and rotatably engaging each side of the gear blank to steady the same against transverse strains occasioned by the operation of said cutting tool thereon, said last named means permitting rotation of the gear blank when in engagement therewith.

11. In a gear cutting machine wherein a cutting tool is reciprocated across the face of a gear blank during its cutting operation thereon, a part disposed on one side of the gear blank and a part disposed on the other side of the gear blank, common means to draw both of said parts against said gear blank simultaneously to support the same against transverse strains occasioned by the operation of said cutting tool thereon, and means to rotate the blank between said parts, and rotatable means on said parts to engage the gear blank and permit rotation thereof when in engagement therewith.

12. In a gear cutting machine wherein a cutting tool is reciprocated across the face of a gear blank during its cutting operation thereon, a support on which a gear blank may be secured, means to rotate the gear blank, a part disposed on one side of the gear blank and a part disposed on the other side of the gear blank, and equalizing means to draw each of said parts towards said gear blank after it is secured on said support and into engagement with the rim of the gear blank, said means being adapted to insure equal pressure against the sides of the gear blank by said parts.

13. In a gear cutting machine wherein a cutting tool is reciprocated across the face of a gear blank during its cutting operation thereon, means to rotate the gear blank, a part disposed on one side of the gear blank and a part disposed on the other side of the gear blank, and means simultaneously to draw each of said parts towards said gear blank and into engagement with the rim of the gear blank, said means including a threaded rod having a right-hand threaded portion and a left-hand threaded portion and a nut to cooperate with each portion, one of said nuts being secured to each of said parts.

14. In a gear cutting machine wherein a cutting tool is reciprocated across the face of a gear blank during its cutting operation thereon, means to rotate the gear blank, a saddle member slidable relatively toward and away from the face of the blank being formed by said cutting tool, and means mounted on said saddle engaging each side of the rim of said gear blank to steady the same against transverse strains occasioned by the operation of said cutting tool thereon.

15. In a gear cutting machine wherein a cutting tool is reciprocated across the face of a gear blank during its cutting operation thereon, means to rotate the gear blank, a saddle member slidable relatively toward and away from the face of the blank being formed by said cutting tool, a part mounted on said saddle and disposed to one side of the gear blank, a part mounted on said saddle and disposed at the other side of the gear blank, and means to draw each of said parts towards said gear blank to support the same against transverse strains caused by the operation of said cutting tool thereon.

16. In a gear cutting machine, a saddle, a carriage reciprocably mounted thereon, cutter supports adjustably mounted on said carriage, and means to secure said supports to said carriage including a pair of worm wheels, each of said worm wheels threadingly engaging a clamp bolt, and a worm for rotating each of said worm wheels, and common means for rotating said worms, comprising a sleeve upon which the worms are secured and a shaft to which the sleeve is slidably keyed.

17. In a gear cutting machine, a saddle, a carriage reciprocably mounted thereon, cutter supports adjustably mounted on said carriage, and means to secure said supports to said carriage including a pair of differentially acting worm wheels, each of said worm wheels threadingly engaging a clamp bolt, and a worm for rotating each of said worm wheels, said worms being secured together for rotation in unison and being movable longitudinally of their axes relatively to the worm wheels, and means to rotate said worms.

18. In a gear cutting machine, a saddle, a carriage reciprocably mounted thereon, cutter supports adjustably mounted on said carriage, and means to secure said supports to said carriage including a pair of worm wheels, each of said worm wheels threadingly engaging a clamp bolt, and a worm for rotating each of said worm wheels, means for rotating said worms in unison and adapted to continue rotating one of said worm wheels when the other of said worm wheels has completed its support securing operation.

19. In a metal cutting machine, means to secure a cutter support to a carriage comprising a pair of clamp bolts fixed to one of said parts, one with right-hand threads and one with left-hand threads, and a pair of worm wheels each threadingly engaging one of said bolts and adapted to press against the other of said parts, and a worm to rotate each worm wheel upon its corresponding bolt to clamp said parts together, said means being secured to a common member for simultaneous rotation.

20. In a metal cutting machine, means to secure a cutter support to a carriage comprising a pair of clamp bolts fixed to one of said parts, one with right-hand threads and one with left-hand threads, and a pair of worm wheels each threadingly engaging one of said bolts and adapted to press against the other of said parts, and a worm to rotate each worm wheel upon its corresponding bolt to clamp said parts together, and common means for rotating said worms comprising a shaft and a sleeve slidably mounted on the shaft and having both said worms secured thereto.

21. In a gear generating machine of the type described, a cutter guide comprising a sleeve-like member having a groove formed in the periphery and extending lengthwise thereof, and a guide member disposed in said groove, the sides of said groove being parallel and disposed substantially tangent to a circle concentric to the sleeve member and of a diameter substantially equal to the width of said groove.

22. In a gear generating machine of the type described, a cutter guide comprising a sleeve-like member having a pair of diametrically opposed grooves formed in the periphery and extending lengthwise thereof, and a guide member disposed in each of said grooves, the sides of said grooves and the cooperating sides of said guide members being parallel and disposed substantially tangent to a circle concentric to the sleeve member and of a diameter substantially equal to the width of the grooves.

23. In a gear cutting machine wherein cutters are reciprocated across the face of a gear blank, means for supporting the blank, and means secured upon a part of the machine other than said supporting means for engaging the rim of the blank adjacent the cutters to hold this blank against strains incident to the engagement of the cutters therewith, said means engaging the blank rim at points opposite the points of engagement of the cutters therewith.

24. In a gear cutting machine, means for supporting and rotating a gear blank, means for reciprocating a pair of cutters across the face of the blank during the rotation thereof, and rim-steadying members for steadying the rim of the blank at the sides thereof adjacent the cutting zone, said members including anti-friction devices engaging the blank and between which the blank is rotated.

25. In a gear cutting machine, means for supporting and rotating a gear blank, means for reciprocating a pair of cutters across the face of the blank, and rim-steadying members extending above and below the cutters and engaging the rim of the blank at the sides thereof adjacent the cutting zone, said members being movable toward and away from the blank after the latter has been mounted on its support, and common means for moving said members.

26. In a gear cutting machine, means for supporting and rotating a gear blank, means for reciprocating a pair of cutters across the face of the blank, and rim-steadying members for steadying the rim of the blank at the sides thereof adjacent the cutting zone, said members being movable toward and away from the blank after the latter has been mounted on its support, and common means for simultaneously moving said members, said moving means having a differential action with respect to said members whereby one may be moved after the other abuts the blank.

27. In a gear cutting machine, a frame, means thereon for supporting and rotating a gear blank, means for reciprocating a pair of cutters across the face of the blank, and rim-steadying members secured to the frame for steadying the rim of the blank at the sides thereof adjacent the cutting zone, said members engaging the rim between the center of the blank and the part thereof engaged by the cutters and permitting rotation of the gear blank when in engagement therewith.

28. A gear generating machine having, in combination, a gear formed planing cutter, a work spindle arranged to carry a circular gear blank, means for imparting relative reciprocatory cutting movements to the cutter and the blank, driving connections for imparting relative rotational movements to the cutter and to the work spindle to maintain a substantially equal peripheral speed at the point of contact, and an additional set of driving connections acting when rendered operative to rotate the work spindle at a substantially faster rate.

29. A gear generating machine having in combination a pinion-shaped cutter, a work spindle arranged to carry a circular gear blank, means for imparting relative reciprocatory movements to the cutter and blank, driving connections for imparting relative rotational movements to the cutter and to the work spindle to maintain a substantially equal surface peripheral speed at point of contact of cutter and blank, a motor and a set of driving connections between the motor and blank acting when rendered operative to rotate the work spindle at a substantially faster rate than said first-named driving connections, and a clutch in said connections between said motor and work spindle to render said second-named driving connections inoperative.

HARRY EDGAR KITCHEN.